United States Patent [19]

Cromeens

[11] 4,429,784
[45] Feb. 7, 1984

[54] INFEED ASSEMBLY FOR RANDOM LENGTH END SHAPING MACHINE

[75] Inventor: Jeff Y. Cromeens, Mesquite, Tex.

[73] Assignee: Industrial Woodworking Machine, Garland, Tex.

[21] Appl. No.: 203,235

[22] Filed: Nov. 3, 1980

[51] Int. Cl.³ .............................................. B65G 25/02
[52] U.S. Cl. ................................... 198/744; 144/2 R; 144/134 R; 144/245 R
[58] Field of Search ................................. 198/774–776, 198/739, 740, 744, 487, 430; 144/245 R, 245 E, 134 R, 242 A, 242 B; 83/435.1, 437, 423; 144/2 R

[56] References Cited

U.S. PATENT DOCUMENTS

| | | | |
|---|---|---|---|
| 1,659,574 | 2/1928 | Lloyd | 144/245 R |
| 2,416,763 | 3/1947 | Lynch | 198/774 |
| 2,649,875 | 8/1953 | Sherman | 144/242 B |
| 3,924,668 | 12/1975 | Cromeens | 144/242 B X |

Primary Examiner—James L. Jones, Jr.
Assistant Examiner—Douglas D. Watts
Attorney, Agent, or Firm—Joseph H. Schley; Thomas L. Cantrell; Stanley R. Moore

[57] ABSTRACT

An infeed assembly or mechanism for advancing wood sticks of random length through an end shaping machine or woodworking apparatus that has at least one end shaper and holddown mechanism for preventing displacement of the sticks during shaping of the ends of said sticks, while permitting travel thereof through the machine, is adapted to coact with an underlying table that supports said sticks with their ends extending transversely thereof throughout the advancement of the sticks; said infeed assembly is composed of a feed shuttle mounted for reciprocal movement in a generally elliptical path or rhombic orbit longitudinally of the table and having an upstanding push mechanism for projection above said table and engagement with said sticks during its feed stroke and for retraction below said table during the return stroke of the feed shuttle; a backup mechanism coacts with the holddown and push mechanism to prevent vibration of the end portions of the sticks during shaping thereof as well as with mechanism for positively supporting said feed shuttle in its elevated position; the holddown mechanism has a flexible wear strip for overlying engagement with said sticks and a multiplicity of independent pressure devices for constantly and separately urging portions of the wear strip downwardly relative to one another so as to maintain said wear strip in engagement with said sticks irrespective of the varying thickness of adjacent sticks even though said variance may be relatively minute.

24 Claims, 13 Drawing Figures

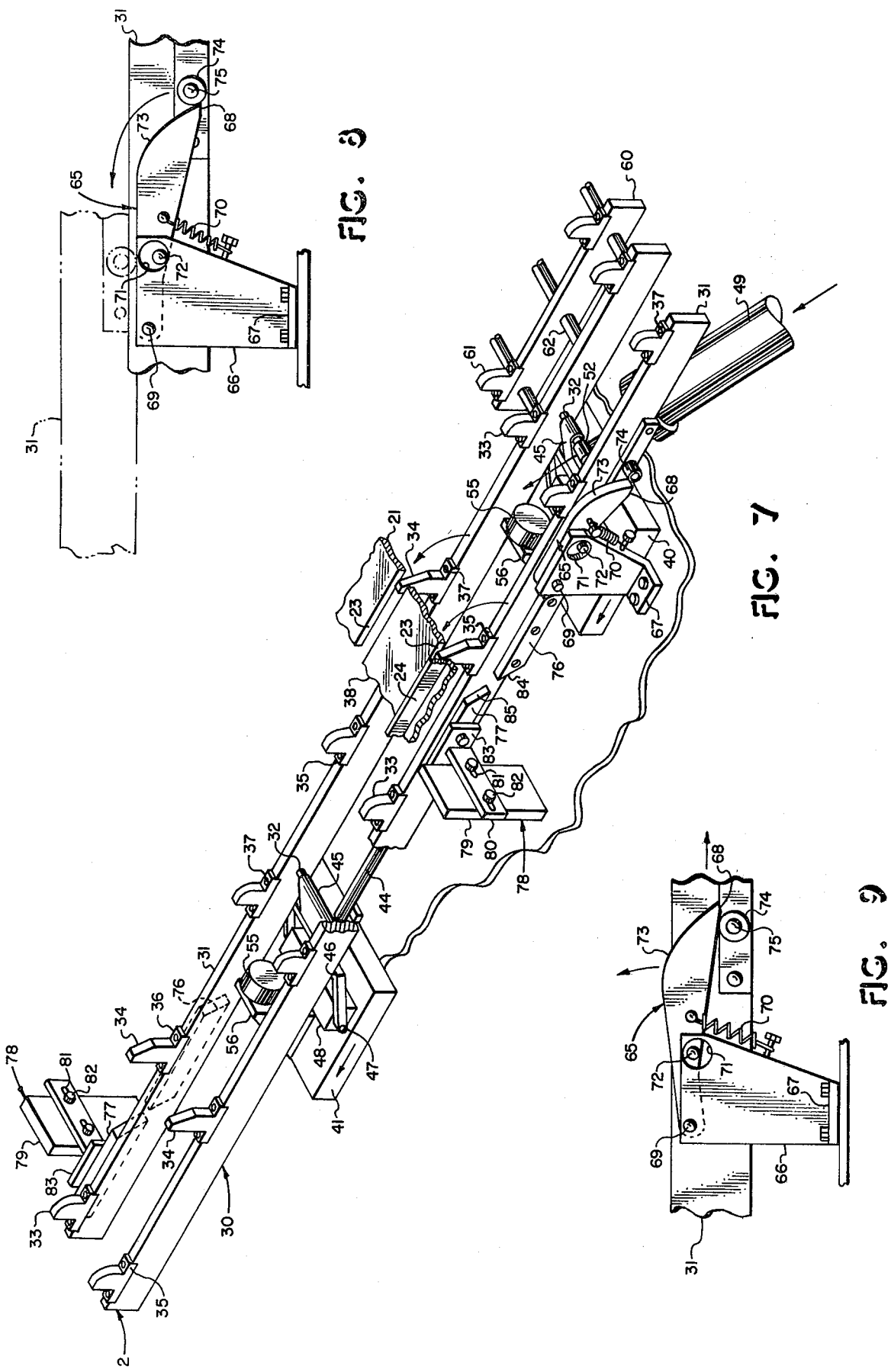

INFEED ASSEMBLY FOR RANDOM LENGTH END SHAPING MACHINE

FIELD OF THE INVENTION

This invention relates to an infeed assembly or mechanism for advancing wood sticks of random length through an end shaping machine or woodworking apparatus that has at least one end shaper for cutting finger joints or otherwise shaping the ends of the sticks and, more particularly, to novel means for holding said sticks against displacement during the cutting or shaping of their ends.

BACKGROUND OF THE INVENTION

Various types of infeed assemblies or mechanisms have been and are in use for advancing work of random length, such as wood sticks and/or blocks, through end shaping machines and many of these assemblies are of the endless conveyor types while others are of the shuttle type having retractable work pushing elements pivotally mounted on a slidable rail, rack or other member. Heretofore, the infeed assemblies of end shaping machines or woodworking apparatuses have been unable to handle sticks that are of short length, such as four (4") inches, or sticks that vary appreciably in length and thickness without expensive and complicated construction.

The handling of the sticks involves maintenance against displacement thereof, other than travel, during the feeding of said sticks and the shaping of their ends. This problem becomes acute when the sticks are of relatively hard wood even though overlying pressure means are provided for confining said sticks in engagement with a supporting surface. These sticks tend to chatter or vibrate while their ends are being shaped, particularly, when serrating or cutting finger joints in the ends of said sticks and the serrations or cuts are of small or fine dimensions so as to require maximum accuracy.

The pertinent prior art includes the following U.S. Pat. Nos.: Lloyd 1,659,574; Miller et al 1,838,780; Muhl et al 2,302,878; Hochstetler 3,580,309; Evans 3,590,987; Cromeens 3,951,189; Kvalheim 3,665,982; Sandberg 3,838,723; Ekholm 4,009,630; Whitten 4,098,154.

A similar infeed assembly is disclosed in copending application, Ser. No. 070,708, filed Aug. 29, 1979, now U.S. Pat. No. 4,246,943.

SUMMARY OF THE INVENTION

The infeed assembly or mechanism of this invention is adapted to handle wood sticks of random length and to advance the sticks intermittently through an end shaping machine or woodworking apparatus that has at least one end shaper, a table for supporting said sticks and coacting overlying holddown means for preventing displacement of said sticks during the shaping of their ends while permitting travel thereof through the machine or apparatus. Feed shuttle means, mounted for reciprocal movement in a generally elliptical path or rhombic orbit longitudinally of the table, has pivotal connection with underlying slidable support means and with reciprocal actuating means for imparting reciprocation to the shuttle means. Spaced link means extend between and pivotally attach the shuttle means to the slidable support means in spaced relationship, whereby reciprocation of the actuating means is adapted to swing the link means about its pivotal attachment to said support means so as to raise and lower said shuttle means into and out of feeding position during the initial portions of its feed and return strokes, respectively.

Although it is preferable to provide a common pivot point for connecting the feed shuttle, actuating and link means to one another, it is noted that said actuating means may be pivotally attached to either said shuttle means or to said link means.

The link means is held against further movement relative to the feed shuttle means and slidable support means between the raising and lowering of said shuttle means to its respective projected and retracted positions so as to only reciprocate said shuttle means and said support means between the aforesaid initial portions of the feed and return strokes of said shuttle means. The initial portions of these strokes are also the terminal portions of the return and feed strokes, respectively. The shuttle means may be in the form of an elongate rectangular rack having spaced parallel longitudinal members at its lateral margins with transversely aligned upstanding push means at spaced intervals for engaging and advancing the wood sticks upon the feed stroke of the shuttle rack. The push means extend or project above the table throughout the feed stroke of the shuttle rack including the initial portion of said stroke which swings the links means upwardly from the nonfeeding or retracted position to the feeding or projected position of said rack; said push means are retracted below said table throughout the return stroke of said shuttle rack including the initial portion of said stroke which swings said links means downwardly from said feeding or projecting position to said nonfeeding or retracted position of said rack.

One of the longitudinal members of the shuttle rack and its path or orbit of reciprocation are contiguous and parallel to the plane of rotation of each end shaper; and one of the push means of said shuttle member is adapted to abut and bear against the upstream side of the inner end portion of each stick during the shaping of its adjacent extremity. It is desirable to provide elongate slide means for supporting the shuttle rack in its elevated position with its push means projecting above the table during its feed stroke between the initial and terminal portions of said stroke as well as during its feed stroke between the initial and terminal portions of said stroke as well as during the end shaping of each stick; and this slide means has a pair of coacting members extending longitudinally of said shuttle rack with one of the members being stationary and the other member being mounted on and movable with said rack relative to and into overlying engagement with said stationary member.

In order to further reinforce the inner end portion of each stick during end shaping thereof, additional backup means is mounted adjacent each end shaper in constant engagement with the contiguous outer surface of the adjacent shuttle rack member to prevent lateral displacement of the shuttle rack.

It is desirable to provide positive lift means for ensuring upward pivotal movement of the shuttle rack upon initiation of the feed stroke of said rack so as to project its push means above the table means for engagement with the sticks in the event that the link means fails to elevate said rack properly. Preferably, the lift means includes a cam surface and coacting follower means mounted on and movable with the shuttle rack.

Preferably, the holddown means overlies and coacts with the table to prevent displacement of the sticks while permitting travel of said sticks therebelow has a housing that is elongated longitudinally of the direction of said stick travel. An elongate wear strip of suitably flexible material depends from and is slidably mounted in the underside of the housing for relative upright movement to hold discrete sticks of random thickness, width and length against displacement during the shaping of their ends. This wear strip is articulated for flexibility at spaced intervals and has upwardly opening recesses that intersect its articulations and terminate above its lower surface so as to have upwardly facing bottoms. Resilient means, such as an helical spring, is confined within each recess so as to bear against its bottom for constantly urging the underlying portion of the wear strip into engagement with the sticks. The articulations of the wear strip may be formed by upwardly opening slots that extend transversely entirely through said strip so as to intersect the recesses. Also, the lower portions of the slots may be enlarged so as to provide the desired flexibility of the wear strip.

BRIEF DESCRIPTION OF THE DRAWINGS

FIG. 7 is an enlarged front perspective view, partly broken away, of said infeed assembly in its retracted nonfeeding position, FIG. 8 is an enlarged side elevational view, partly broken away, of automatic elevating means for said infeed assembly, preparatory to its lifting, FIG. 9 is a view, similar to FIG. 7, showing the automatic elevating means moving to its lowered position.

DESCRIPTION OF A PREFERRED EMBODIMENT

Figure 1:
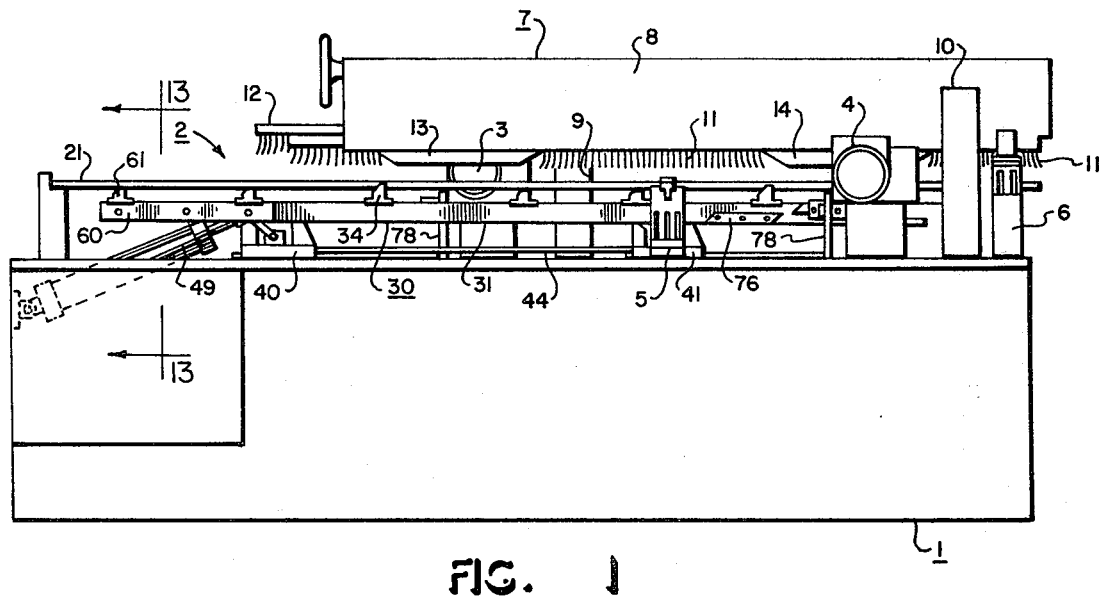
FIG. 1 is a rear side elevational view of a dual random length end shaping machine or woodworking apparatus having an infeed assembly or mechanism constructed in accordance with the invention with the upper side wall of the machine removed to show the feed assembly.
Figure 2:
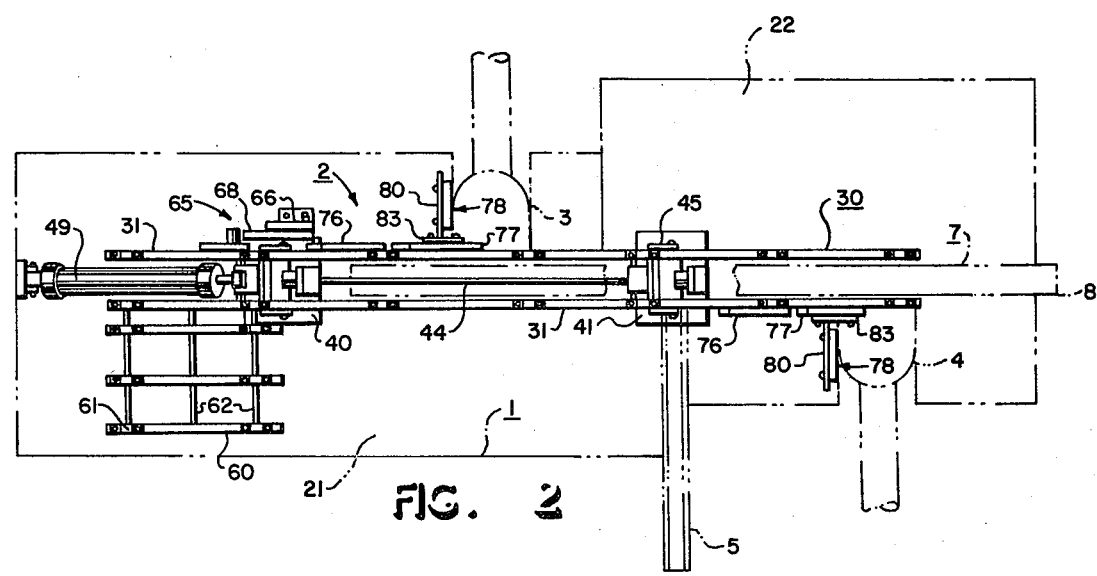
FIG. 2 is a top plan view of the feed assembly showing the end shaping machine is broken lines.

In FIGS. 1, 2 of the drawings, the numeral 1 designates the elongate rectangular base frame or housing of a dual random length end shaping machine or woodworking apparatus comprising an infeed assembly or mechanism 2 embodying the principles of the invention adjacent one end of the base frame, first and second or anterior and posterior spaced end shapers 3, 4 for serrating or cutting finger joints or otherwise shaping the ends of wood sticks of random length such as relatively short sticks and/or blocks, a transverse transfer conveyor 5 for shifting said sticks or blocks linearly between the end shapers, and an adhesive or glue applicator 6 adjacent the outfeed end of said base frame. A pressure head assembly 7, having an elongate narrow rectangular housing or frame 8, overlies the longitudinal medial portion of base frame 1 in parallel spaced relationship and its housing or frame is supported by a pair of upright frame members or pedestals 9, 10 upstanding from said base frame adjacent and downstream of first end shaper 3 on the anterior side of said housing or frame and between second end shaper 4 and glue applicator 6 on the posterior or opposite side of said housing. It is noted that the pressure head assembly and the upright frame members or pedestals constitute major portions of the holddown means that is adapted to prevent displacement of the sticks conveyed therebetween by infeed assembly or mechanism 2 without impeding the travel of said sticks.

Elongate narrow housing or frame 8 of pressure head assembly 7 is adjustable vertically relative to pedestals 9, 10 in accordance with the thickness of the aforesaid sticks. A suitable adjustable mounting is shown in Cromeens U.S. Pat. No. 3,924,668 as well as by copending application, Ser. No. 070,708, filed Aug. 29, 1979, now U.S. Pat. No. 4,246,943. Elongate rectangular guide brushes 11 may extend longitudinally and horizontally of the pressure head housing 8 and depend below the lower margin of said housing for engaging wood sticks and/or blocks, whereby travel of the sticks or blocks is resisted sufficiently to maintain them in relative perpendicular relationship. As shown at 12, in FIG. 1, a pair of the brushes may project from the infeed end of the housing for initial engagement with the blocks and/or sticks, and the endmost or leading brush may be elevated so as to provide a tactile warning of the proximity of moving parts of the machine.

Figure 10:
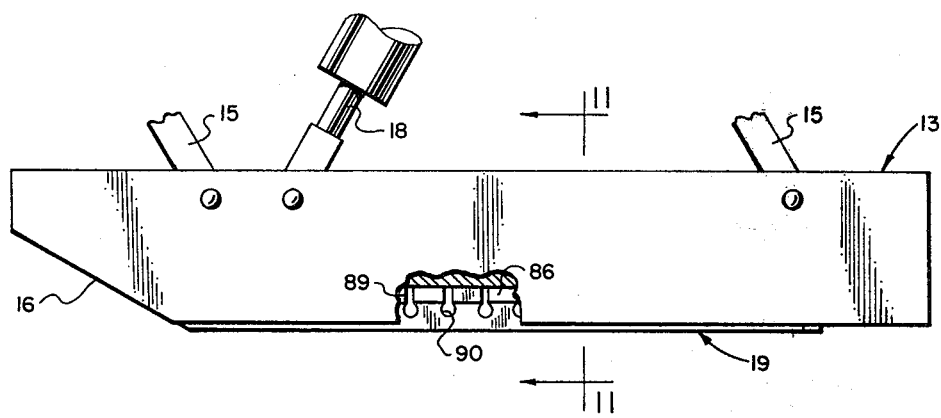
FIG. 10 is a front side elevational view, partly broken away, of one of the pressure head mechanisms.

Brushes 11 are continuous with the lower margin of housing 8 except at or in transverse alignment with spaced end shapers 3, 4 where horizontal pressure elements or holddown shoes 13, 14, respectively, are pivotally suspended within said housing adjacent the end portions of the holddown shoes from the lower ends of a pair of pivotally connected links 15 so as to depend below said housing for engaging and preventing displacement of sticks and/or blocks during the shaping of the ends thereof. Each holddown shoe 13, 14 may be of any suitable construction and, as shown in FIG. 10, may be of elongate generally elongate rectangular configuration and have the lower margin of its infeed or upstream end relieved so as to provide an inclined or slanted surface 16 to guide and facilitate riding of the blocks or sticks downstream beneath said shoe. For constantly urging each of the pressure elements or holddown shoes downwardly relative to the pressure head assembly housing 8, a pneumatic assembly or other suitable pressure responsive member 17 is provided for each shoe and is pivotally suspended from said housing and has its projecting lower end or rod 18 pivotally connected to the respective shoe. As will be described hereinafter, each of the holddown shoes has pressure responsive means in the form of an articulated elongate longitudinal wear strip 19 of suitable flexible material suspended from its lower margin for overlying engagement with the wood sticks or blocks. As shown at 20 in FIG. 11, the underside of each of the pressure elements holddown shoes 13, 14 is recessed to provide a complementary groove or channel for supporting engagement by wear strip 19.

As shown in FIGS. 1, 2, base frame or housing 1 of the dual end shaping mechanism has horizontal generally flat first or anterior and second or posterior beds or tables 21, 22 at its respective infeed and outfeed portions or sections for coacting with infeed assembly 2 as well as with end shapers 3, 4, transfer conveyor 5 and glue applicator 6. Tables 21, 22 are elongate, rectangular and disposed in offset or staggered relationship with said transfer conveyor or extending transversely of the inner or discharge end portion of the first or infeed table 21 for directing sticks and/or blocks from said infeed table transversely onto the inner or infeed end portion of said second or outfeed table 22.

A relatively wide slot or elongate rectangular opening 23 (FIGS. 1, 7, 13) extends longitudinally of the infeed and outfeed tables in spaced parallel relation to their lateral or longitudinal margins, from the intake portion of said infeed or first table to the discharge end of said outfeed or second table in spaced underlying vertical alignment with pressure head assembly housing 8, whereby the wide slot has an open right or outfeed end. As shown at 24 in FIG. 13, a fence or guide rail for contact by the anterior ends of the sticks or blocks is coextensive with the anterior longitudinal margin of slot 23 from the infeed end of table 21 to first or anterior end shaper 3. Although not illustrated, a similar fence is provided at the posterior longitudinal margin of this wide slot in table 22 between conveyor 5 and posterior end shaper 4 for guiding engagement by the posterior ends of the sticks.

One or more relatively narrow slots or elongate openings 25, of slightly less length than fence 24, may be provided in table 21 in spaced parallel relation to the wide slot as well as to one another; and these slots coact to accommodate infeed assembly 2 and particularly the operation thereof. A similar guide rail or fence (not shown) for contact by the posterior ends of the blocks or sticks is provided at the posterior longitudinal margin of the wide slot between transverse transfer conveyor 5 and posterior or second end shaper 4.

The infeed assembly, as best shown in FIGS. 3-7, includes an elongate rectangular feed rack or shuttle 30, disposed within wide slot 23 in parallel spaced relationship and having a pair of spaced parallel horizontal rails or longitudinal members 31 at its lateral or longitudinal margins fastened together by suitable transverse rods or struts 32 at suitable intervals. Upstanding push lugs or block backups 33, 34 rest on and are secured to rack rails 31, such as by screws 37 (FIG. 7) extending through flanged bases or feet 35, 36 respectively, of the lugs at suitable intervals and at the ends of said rails. Push lugs 34 are relatively tall, being of greater height or upright length than push lugs 33 so as to project thereabove for coaction with holddown shoes 13, 14 to prevent displacement of the short sticks and/or blocks during shaping of the ends of said sticks and/or blocks. The lugs of each shuttle rail are equally spaced and said lugs of one rail are aligned transversely with said lugs of the other rail of the shuttle rack.

Figure 13:
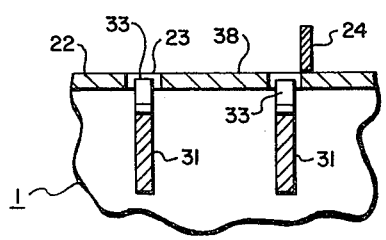
FIG. 13 is an enlarged transverse vertical sectional view taken on line 13—13 of FIG. 1.

As best shown in FIG. 13, shuttle or feed rack 30 straddles an elongate rectangular horizontal bed rail or bar 38 that is mounted in and is generally coextensive with the wide slot 23 of tables 21, 22 in spaced parallel relationship between rails 31 of said rack. Bed rail 38 is adapted to support the inner ends of short sticks and/or blocks and coact with brushes 11 and the pressure elements or holddown shoes 13, 14 to maintain said blocks/or sticks against upward displacement and sluing or pivotal movement during end shaping thereof. The shuttle or feed rack is mounted for clockwise reciprocal movement in a generally elliptical path or rhombic orbit, as indicated in FIGS. 3-6 and as will be explained hereinafter, for feeding and advancing the sticks or blocks through the end shaping machine.

Infeed assembly 2 overlies and is reciprocally mounted by a pair of spaced horizontal rectangular saddle members or blocks 40, 41 (FIGS. 3-7) overlying and slidable connected to spaced complementary slide members or plates 42, 43, respectively, that rest on and are secured to a suitable support (not shown). Each of the slide members 42, 43 is of greater length than its saddle members 40, 41 to permit reciprocation of each saddle member from the retracted nonfeeding position of the infeed assembly (FIG. 3) to the protracted or projecting infeed position of pusher lugs 33, 34 (FIGS. 4, 5) of said assembly. A horizontal rod 44 extends between and joins together reciprocal saddle members 40, 41.

As best shown in FIG. 7, each saddle member is pivotally attached to longitudinal rails 31 of rack or shuttle 30 by a suitable upright link or hinge plate 45 having a relatively wide transverse yoke 46 projecting from its lower end and straddling said saddle member. Pivot pins 47 project laterally from the ends of a transverse bar 48 overlying and secured to each saddle member 40, 41 for connection with the free lower ends of the arms of yoke 46. The upper end of each yoke is pivotally attached to one of the transverse rail connecting rods 32 of the rack.

For reciprocating rack or shuttle 30 longitudinally of bed rail 38, a pneumatic cylinder 49 has its lower end pivotally supported at the infeed or upstream end wall of base frame 1 as shown at 50 in FIGS. 3-6. A piston rod 51 projects from the upper or free end of cylinder 49 and is connected by a clevis 52 (FIG. 7) to the adjacent transverse rail connecting rod 32 whereby reciprocation of the piston rod imparts reciprocal movement to the feed rack or shuttle.

Figure 3:
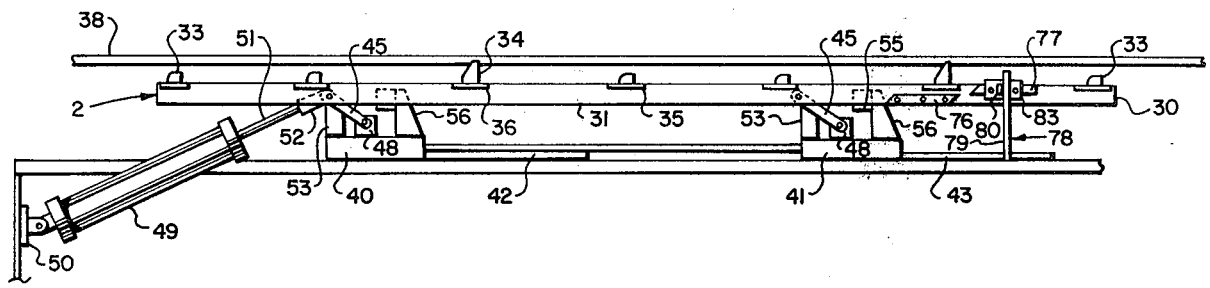
FIG. 3 is a schematic rear side elevational view of said infeed assembly in its nonfeeding position with its upright pusher lugs retracted.

For supporting rack 30 and its lugs 33, 34 in the retracted position shown in FIGS. 3, 7 an angular bumper 53 upstands from the infeed or upstream end portion of each saddle member 40, 41 adjacent its overlying transverse bar 48 and has an inclined upper surface 54 for engagement by link or hinge plate 45. The feed rack or shuttle is swung from its retracted to its protracted or projecting position by clockwise pivoting of the link or hinge plate to its upright position (FIG. 4) upon outward reciprocation of piston rod 51 from cylinder 49 until said link strikes the upright surface of a shock absorber 55 supported by an upright bumper 56 upstanding from the outfeed or downstream end portion of each saddle member. During this forward or infeed movement of rack 30, its push lugs engage short sticks and/or blocks.

Figure 4:
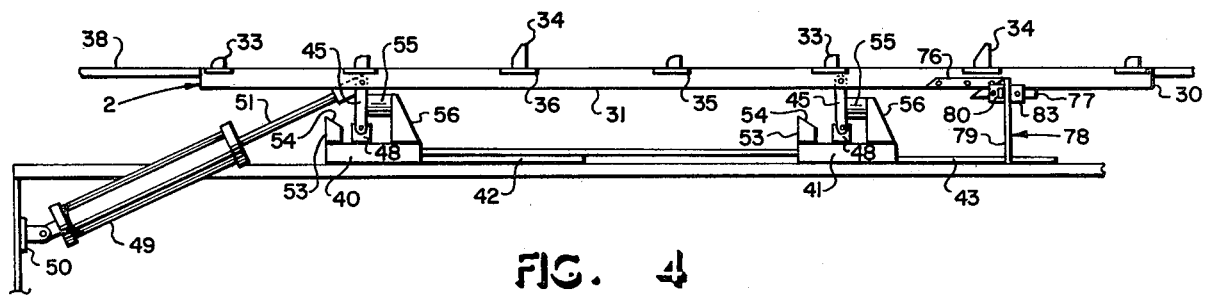
FIG. 4 is a view, similar to FIG. 3, showing said assembly in its initial feeding position with said pusher lugs protracted.
Figure 5:
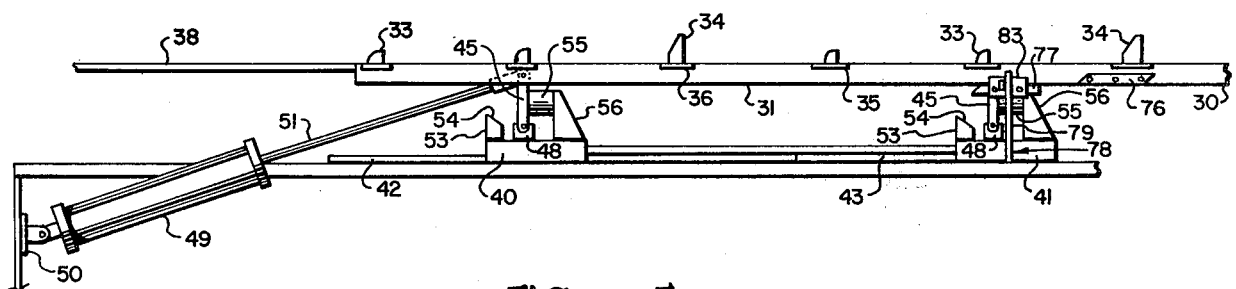
FIG. 5 is a view similar to FIG. 4 and illustrating said assembly at the terminal end of the infeed stroke of said protracted pusher lugs.

As shown in FIG. 5, additional or continued outward movement of the piston rod from its cylinder imparts reciprocal movement to saddle members 40, 41 relative to slide plates 42, 43 in a downstream or outfeed direction whereby push lugs 33, 34 of the feed rack or shuttle advance the sticks or short blocks to and through the end shaping machine so as to outfeed said sticks or short blocks. It is noted that wide slot 23 of the tables is of greater length than shuttle or rack 30 so that the infeed or left end of said rack when retracted (FIG. 3) is at the infeed or left end of said slot and that the outfeed or right end of said rack when fully protracted or projected (FIG. 5) is at the outfeed or right end of said slot. Although the feed rack or shuttle and its push lugs are in a protracted or projecting position in FIG. 4, piston rod 51 is not extended to its full length whereby said rack and lugs are merely elevated and the slide plates remain stationary.

Figure 6:
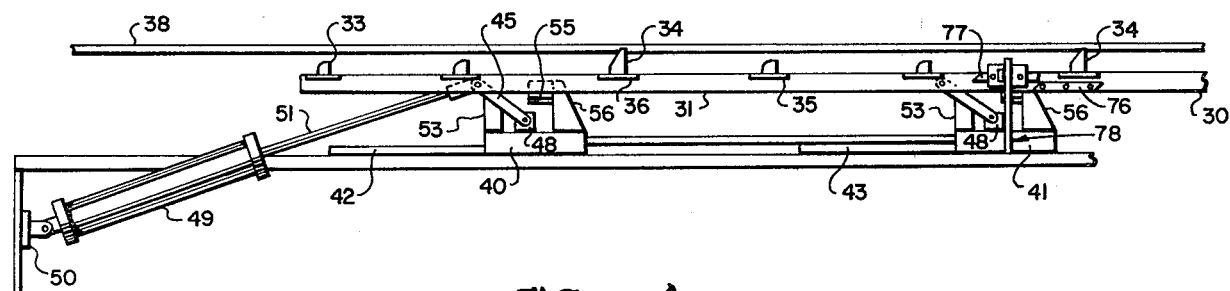
FIG. 6 is a view, similar to FIG. 5, showing said assembly in its initial reverse reciprocal position with said pusher lugs retracted to nonfeeding position.

As shown in FIG. 6, initial inward reciprocation of the piston rod relative to its cylinder 49 pivots each link or hinge plate 45 counterclockwise or toward the left into engagement with inclined surface 54 of each bumper 53 and merely swings rack 30 with its lugs 33, 34 to the left toward upstream retracted position. Continued inward movement of piston rod 51 returns rack or shuttle 30 with its push lugs (FIG. 3) to nonfeeding position. It is noted that the spacing between adjacent push lugs and the stroke or travel of the feed rack or shuttle are of the same length, whereby the short wood sticks and/or blocks are advanced by the push lugs upon each stroke of said rack a distance sufficient to permit engagement of said sticks and/or blocks by the next preceding or downstream lugs.

As mentioned, one or more relatively narrow short elongated openings or slots 25 may be provided in infeed table 21 to accommodate one or more complementary outrigger members of bars 60 (FIG. 7) having a push lug or block backup 61, similar to push lugs 33 of rails 31 of feed rack or shuttle 30, upstanding from each of its ends in transverse alignment with the push lugs at the infeed ends of said rails and the adjacent preceding lugs. Outrigger bars 60 may be connected to the adjacent rail of the feed rack or shuttle by suitable transverse members 62 extending therebetween for reciprocal movement therewith. Although not illustrated, it is noted that one or more similar outriggers may be provided at the outfeed end of shuttle rack 30 for coacting with said rack and the second or outfeed table 22. These outriggers or outrigger members are adapted to engage the outer portions of wood sticks of greater length than the short blocks to prevent sluing of said sticks. The spacing between transversely aligned push lugs of the parallel rails of the rack is sufficient to control the movement of short blocks.

In order to ensure the upward pivotal counterclockwise movement (FIGS. 7-9) of the longitudinal rails 31 and upstanding push lugs 33, 34 of feed rack or shuttle 30 upon initial actuation of cylinder 49, a guide assembly 65 is provided and comprises an upright bracket 66 overlying the infeed or upstream end portion of infeed table 21 adjacent and forwardly of saddle member 40. A horizontal foot or flange 67 extends forwardly from the lower end of bracket 66 and is suitably secured to the infeed table. Between the opposed parallel spaced surfaces of the bracket and the adjacent front shuttle rail, a generally horizontal elongate cam element or plate 68 is supported by a pivot pin 69 projecting forwardly from the upper end portion of said bracket adjacent its downstream or outfeed upright margin.

For constantly urging or biasing cam element 68 clockwise, or downwardly, a helical spring 70 extends between and has its ends attached to the lower medial portion of said cam element and the infeed or upstream margin of bracket 66; and the upper portion of said bracket margin has a relatively large circular opening 71 extending therethrough for receiving and coacting with the front or outer end portion of a pin 72, of relatively small diameter, projecting transversely portion of said cam element to limit the amplitude or extent of its arcuate movement about the axis of pivot pin 69. The outer or upstream portion of the elongate cam element is enlarged and has an upwardly directed lobe or cam surface 73 adapted to coact with a roller 74 confined upon a horizontal pin 75 projecting forwardly from anterior rail 31 of rack or shuttle 30. As shown in FIG. 8, roller 74 is adapted to engage lobe 73 of cam element 68 and to ride upwardly thereon during initial downstream movement of the shuttle so as to ensure its elevation to feeding position (FIG. 4). Upon initial reverse reciprocation of shuttle 30, the roller rides beneath the cam element (FIG. 9).

Cam element 68 is spaced transversely or horizontally from the anterior of the feed rack or shuttle to accommodate therebetween an elongate horizontal slide or flat bar or member 76 secured to and extending longitudinally of said rail at its lower margin downstream of said cam element (FIG. 7) for movement therewith. Slide bar 76 underlies the tall push lug 34, coacting with upstream holddown shoe 13, and is adapted to coact with a similar downstream horizontal bar 77 that extends longitudinally of the anterior side of front rack rail 31 in parallel relationship. A suitable mounting bracket 78 supports stationary slide bar 77 and has an upright leg or plate 79 secured to an upstanding from infeed table 21 adjacently upstream of end shaper 3. This bracket leg extends perpendicularly to slide bars 76, 77 and has a horizontal flat bar or arm 80 overlying and adjustable fastened to its upstream surface. A pair of aligned horizontal slots or elongate openings 81 are provided in arm 80 for receiving and coacting with a pair of bolts or screws 82 projecting upstream from bracket leg 79. The horizontal arm has a horizontal flat bar or arm 83 secured to and extending transversely of its inner or posterior end, in parallel relation to anterior rail 31 of rack or shuttle 30, for supporting stationary slide bar 77 in aligned overlying engagement with movable slide bar 76 during reciprocation of said rack or shuttle between its retracted and protracted or projecting positions. If desired and as shown in FIG. 7, the slide bars may have complementary inclined inwardly facing inner ends 84, 85 to ensure clearance of said bars upon upward and downward movement of the rack or shuttle.

In order to support the downstream or outfeed end portion of the rack or shuttle 30, another pair of coacting movable and stationary slide bars or members 76 and 77, respectively, are provided posteriorly of rear rail 31 of said shuttle adjacently upstream from end shaper 4 (FIGS. 1,2). Movable slide bar 76 is mounted on the posterior side of the rear shuttle rail beneath the tall push lug 34 which coacts with downstream holddown shoe 14. Upright leg 79 of mounting bracket 78 upstands from outfeed table 22 for supporting horizontal arms 80 and 83. As shown in FIG. 7, stationary slide bar 77 is mounted on the inner or anterior end of bar 83 so as to coact with movable slide bar 76 in the manner described hereinbefore. In addition to supporting rack or shuttle 30 in its upper or feeding position, each of the stationary slide bars is in constant engagement with the contiguous side or lateral surface of the adjacent rail of the feed rack or shuttle so as to bear against said rail and prevent lateral movement or displacement of said shuttle. As stated hereinbefore, the tall push lugs of the shuttle rails constantly engage and bear against the upstream sides of the sticks during shaping of their ends to prevent any displacement of said sticks. Also, each arm or bar 83 of each bracket engages and bears against the contiguous outer side of the adjacent movable slide bar when it is resting upon the stationary slide bar coacting therewith and constantly engaging the shuttle rail. Of course, holddown shoes 13, 14 prevent upward displacement of the sticks. Preferably, the cutting means (not shown) of end shapers 3, 4 rotate upstream or in a direction opposed to the downstream feeding stroke of rack or shuttle 30, counterclockwise in FIGS. 1-6 and clockwise in FIG. 7.

Figure 12:
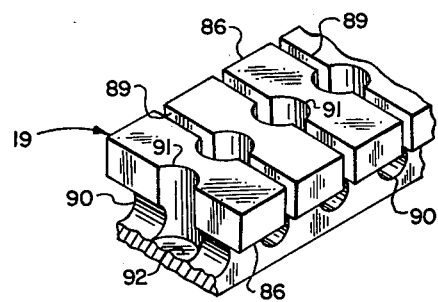
FIG. 12 is an enlarged broken view of a portion of the holddown shoe of one of the pressure head mechanisms.
Figure 11:
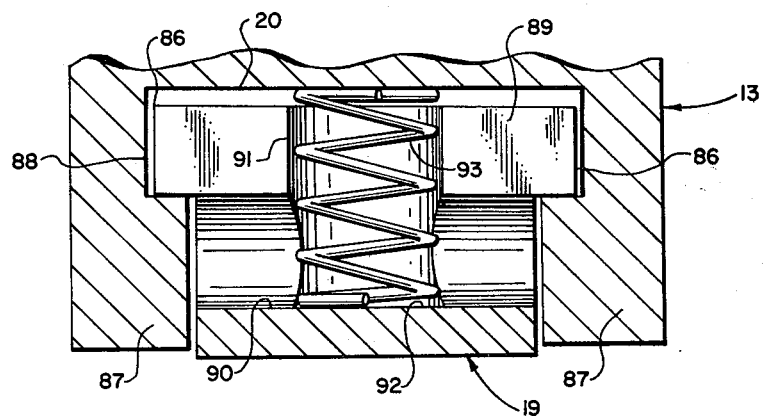
FIG. 11 is a transverse vertical sectional view, on an enlarged scale, taken on the line 11—11 of FIG. 10.

As shown in FIGS. 11, 12, articulated elongate wear strip 19 is transversely T-shaped so as to have a pair of coextensive lateral top flanges 86 projecting outwardly from its upper longitudinal margins. A pair of inwardly facing lateral flanges or shoulders 87 is coextensive with the outer margins of the longitudinal side walls of channel or groove 20 of each holddown shoe 13, 14 so as to underlie wear strip flanges 86 and support the wear strip. Also, flanges 87 of the channel or groove provide a pair of coextensive recesses 88 at the inner portions of the longitudinal side walls of said channel or groove to accommodate the flanges of wear strip 19 (FIG. 11). Recesses 88 are of greater transverse depth and vertical width than the vertical thickness and transverse width of the wear strip flanges to permit relative movement of said wear strip.

The latter is formed of any suitably flexible material, and its flexibility may be enhanced or provided by a multiplicity of (preferably equally) spaced upright slots 89 extending transversely through its lateral flanges 86 whereby the wear strip is articulated. Below these flanges and communicating with the lower end of each transverse slot 89, a coextensive horizontal cylindrical opening or bore 90 extends transversely entirely through wear strip 19 in parallel vertical alignment with said transverse slot and thereby form a continuation thereof. The diameter of each opening or bore 90 may be greater than the width of its communicating transverse slot so as to provide an inverted keyhole configuration. Thus, the effective width of the lower portion of each slot 89 is increased and the width of the material between the lower portions of adjacent slots is decreased thereby increasing the flexibility of the wear strip. An upright cylindrical opening or socket 91 intersects the medial portion of each transverse slot and its communicating transverse opening or bore and extends to the bottom of said opening or bore as well as through the lateral flanges and topside of the wear strip.

As best shown at 92 in FIG. 12, each upright socket 91 has a flat circular lower end or bottom which is aligned with the lowest portion of the wall of the intersecting transverse bore 90. A helical spring 93 is confined within each upright socket and has its upper end bearing against the downwardly facing bottom of channel or groove 20 so as to constantly urge wear strip 19 downwardly outward toward feed rack or shuttle 30 into engagement with the wood strips. Normally, top flanges 86 of the wear strip rest upon flanges 87 of the channel or groove; however, the vertical width of recesses 88 being greater than the vertical thickness of said wear strip flanges permits upward and downward movement of said wear strip in accordance with the variations in thickness of the wood strips. Due to the multiplicity of upright transverse slots 89 and communicating bores 90, adjacent portions of wear strip 19 may flex vertically of one another whereby said wear strip may undulate. Of course, the multiplicity of helical springs 93 maintains the contour of undulations of the wear strip resulting from engagement with the wood sticks and permits movement of said strip contour with said sticks.

The foregoing description of the invention is explanatory thereof and various changes in the size, shape and materials, as well as in the details of the illustrated construction may be made, within the scope of the appended claims, without departing from the spirit of the invention.

I claim:

1. In a woodworking apparatus that has at least one end shaper, and table means for supporting sticks of random length during their travel through the apparatus and means overlying and coacting with the table means for holding the sticks against displacement during the shaping of their ends;

an infeed assembly for advancing said sticks through said apparatus comprising elongate shuttle means extending and movable longitudinally of said table means in a generally rhombic orbit and having upstanding push elements adapted to project above said table means during the feed stroke of the shuttle means for engagement with said sticks and adapted to retract below said table means during the return stroke of said shuttle means, reciprocably mounted means underlying and supporting the elongate shuttle means, link means extending between and pivotally connecting said shuttle means to the supporting means in spaced parallel relationship, one end of the link means having pivotal connection with said shuttle means and the opposite end of said link means having pivotal connection with said supporting means for maintaining the spaced parallel relationship of said shuttle and supporting means, actuating means for initially pivoting said link means upwardly about the axis of its pivotal connection with said supporting means to an upright poisition so as to elevate said shuttle means and project its upstanding push elements above said table means for engagement with said sticks, means for preventing continued pivotal movement of said upright link and permitting straight line longitudinal movement of said shuttle means as well as reciprocal movement to said supporting means to complete the feed stroke of said shuttle means, the actuating means being reversible to initially pivot said link means downwardly in a reverse direction from its upright position so as to lower said shuttle means and retract its push elements below said table means, means for preventing continued pivotal movement of said downwardly pivoted link means whereby straight line longitudinal movement is imparted to said shuttle means to complete the return stroke of said shuttle means, guide means for elevating said shuttle means upon initiation of its feed stroke so as to pivot said link means upwardly to upright position with said upstanding push elements of said shuttle means projecting above said table means, the guide means having an upwardly facing cam surface adjacent and extending longitudinally of said shuttle means and follower means mounted on said shuttle means for movement therewith and projecting ransversely therefrom for engagement with and riding upon the upwardly facing cam surface during the upward pivoting of said link means.

2. An infeed assembly as defined in claim 1 wherein said guide means includes a cam element mounted for upward and downward movement relative to and extending longitudinally of said elongate shuttle means, the cam element having the upwardly facing surface thereon, resilient means for resisting upward movement and for permitting downward movement of said cam element when the follower means rides upon said cam surface as well as permits said follower means to pass beneath said cam element during the return stroke of the lowered shuttle means with its upstanding push elements retracted below said table means.

3. An infeed assembly as defined in claim 2 wherein said movable can element is pivotally mounted for upward and downward arcuate movement.

4. An infeed assembly as defined in claim 3 including slide means for supporting said elongate shuttle means in its elevated position with its upstanding push elements projecting above said table means for engagement with said sticks during the shaping of their ends, the slide means having a stationary member adjacent and extending longitudinally of said shuttle means and a coacting parallel member mounted on and extending longitudinally of said shuttle means for movement therewith and adapted to slidably engage and rest upon the stationary slide member when said shuttle means is elevated so as to prevent downward movement thereof during said end shaping.

5. An infeed assembly as defined in claim 4 wherein the stationary slide member is in constant engagement with an adjacent lateral surface of said elongate shuttle means to prevent lateral movement thereof.

6. An infeed assembly as defined in claim 4 wherein said stationary slide member includes reinforcement means for prevent lateral displacement of said elongate shuttle means.

7. An infeed assembly as defined in claim 1 including slide means for supporting said elongate shuttle means in its elevated position with its upstanding push elements projecting above said table means for engagement with said sticks during the shaping of their ends, slide means for supporting said elongate shuttle means in its elevated position with its upstanding push elements projecting above said table means for engagement with said sticks during the shaping of their ends, the slide means having a stationary member adjacent and extending longitudinally of said shuttle means and a coacting parallel member mounted on and extending longitudinally of said shuttle means for movement therewith and adapted to slidably engage and rest upon the stationary slide member when said shuttle means is elevated so as to prevent downward movement thereof during said end shaping.

8. An infeed assembly as defined in claim 7 wherein the stationary slide member is in constant engagement with the adjacent side of the elongate shuttle means to prevent lateral movement thereof.

9. An infeed assembly as defined in claim 7 wherein said stationary slide member includes reinforcement means for preventing lateral displacement of said elongate shuttle means.

10. In a woodworking apparatus that has at least one end shaper and table means for supporting sticks of random length during their travel through the apparatus and means overlying and coacting with the table means for holding the sticks against displacement during the shaping of their ends;

an infeed assembly for advancing said sticks through said apparatus comprising elongate shuttle means extending and movable longitudinally of said table means in a generally rhombic orbit and having upstanding push elements adapted to project above said table means during the feed stroke of the shuttle means for engagement with said sticks and adapted to retract below said table means during the return stroke of said shuttle means, reciprocably mounted means underlying and supporting the elongate shuttle means, link means extending between and pivotally connecting said shuttle means to the supporting means in spaced parallel relationship, one end of the link means having pivotal connection with said shuttle means and the opposite end of said link means having pivotal connection with said supporting means for maintaining the spaced parallel relationship of said shuttle and supporting means, actuating means for initially pivoting said link means upwardly about the axis of its pivotal connection with said supporting means to an upright position so as to elevate said shuttle means and project its upstanding push elements above said table means for engagement with said sticks, means for preventing continued pivotal movement of said upright link means and permitting straight line longitudinal movement of said shuttle means as well as reciprocal movement of said supporting means to complete the feed stroke of said shuttle means, the actuating means being reversible to initially pivot said link means downwardly in a reverse direction from its upright position so as to lower said shuttle means and retract its push elements below said table means, means for preventing continued pivotal movement of said downwardly pivoted link means whereby straight line longitudinal movement is imparted to said shuttle means to complete the return stroke of said shuttle means, slide means for supporting said elongate shuttle means in its elevated position with its upstanding push elements projecting above said table means for engagement with said sticks during the shaping of their ends, the slide means having a stationary member adjacent and extending longitudinally of said shuttle means and a coacting parallel member mounted on and extending longitudinally of said shuttle means for movement therewith and adapted to slidably engage and rest upon the stationary slide member when said shuttle means is elevated so as to prevent downward movement thereof during said end shaping.

11. An infeed assembly as defined in claim 10 wherein the stationary slide member is in constant engagement with an adjacent lateral surface of said elongate shuttle means to prevent lateral movement thereof.

12. An infeed assembly as defined in claim 10 wherein said stationary slide member includes reinforcement means for preventing lateral displacement of said elongate shuttle means.

13. An infeed assembly as defined in claim 1 wherein the means overlying and coacting with said table means for holding said sticks against displacement during the shaping of their ends includes a pressure head assembly for holding discrete sticks of random thickness, width and length against displacement while permitting travel of said sticks thereebeneath, the pressure head assembly having a housing elongated longitudinally of the direction of travel of said sticks, an elongate wear strip of suitably flexible material slidably mounted in the underside of the housing and depending therefrom for upright movement relative thereto, the wear strip being articulated at spaced intervals and having upwardly opening recesses intersecting its articulations and terminating above the lower surface thereof so as to have upwardly facing bottoms, means confined within each recess and bearing against its bottom for resiliently urging the underlying portion of said wear strip into engagement with said sticks.

14. An infeed assembly as defined in claim 13 wherein said articulations of said wear strip are formed by upwardly opening slots extending transversely entirely through said strip so as to intersect the recesses.

15. An infeed assembly as defined in claim 14 wherein the lower portions of the upwardly opening slots are enlarged so as to increase the flexibility of said wear strip.

16. An infeed assembly as defined in claim 15 wherein the resilient means confined within each upright recess of said wear strip includes an upright helical spring.

17. In a woodworking apparatus that has at least one end shaper and table means for supporting sticks of random length during their travel through the apparatus and hold down means overlying and coacting with the table means for holding the sticks against displacement during the shaping of their ends;

an infeed assembly for advancing said sticks through said apparatus comprising elongate shuttle means extending and movable longitudinally of said table means in a generally rhombic orbit and having upstanding push elements adapted to project above said table means during the feed stroke of the shuttle means for engagement with said sticks and adapted to retract below said table means during the return stroke of said shuttle means, reciprocably mounted means underlying and supporting the elongate shuttle means, link means extending between and pivotally connecting said shuttle means to the supporting means in spaced parallel relationship, one end of the link means having pivotal connection with said shuttle means and the opposite end of said link means having pivotal connection with said supporting means for maintaining the spaced parallel relationship of said shuttle and supporting means, actuating means for initially pivoting said link means upwardly about the axis of its pivotal connection with said supporting means to an upright position so as to elevate said shuttle means and project its upstanding push elements above said table means for engagement with said sticks, means for preventing continued pivotal movement of said upright link and permitting straight line longitudinal movement of said shuttle means as well as reciprocal movement of said supporting means to complete the feed stroke of said shuttle means, the actuating means being reversible to initially pivot said link means downwardly in a reverse direction from its upright position so as to lower said shuttle means and retract its push elements below said table means, and means for preventing continued pivotal movement of said downwardly pivoted link means whereby straight line longitudinal movement is imparted to said shuttle means to complete the return stroke of said shuttle means;

the aforesaid means overlying and coacting with said table means for holding said sticks against displacement during the shaping of their ends includes a pressure head assembly for holding discrete sticks of random thickness, width and length against displacement while permitting travel of said sticks thereebeneath, the pressure head assembly having a housing elongated longitudinally of the direction of travel of said sticks, an elongate wear strip of suitably flexible material slidably mounted in the underside of the housing and depending therefrom for upright movement relative thereto, the wear strip being articulated at spaced intervals and having spaced upwardly opening recesses intersecting the articulations of said strip and terminating above the lower surface thereof so as to have upwardly facing bottoms, means confined within each recess and bearing against its bottom for resiliently urging the underlying portion of said wear strip into engagement with said sticks.

18. An infeed assembly as defined in claim 17 wherein said articulations of said wear strip are formed by upwardly opening upright slots extending transversely entirely through said strip.

19. An infeed assembly as defined in claim 18 wherein the lower portions of the upwardly openings slots are enlarged so as to provide the desired flexibility of said wear strip.

20. An infeed assembly as defined in claim 19 wherein the resilient means confined within each upright recess of said wear strip includes an upright helical spring.

21. An infeed assembly as defined in claim 13 including slide means for supporting said elongate shuttle means in its elevated position with its upstanding push elements projecting above said table means for engagement with said sticks during the shaping of their ends, the slide means having a stationary member adjacent and extending longitudinally of said shuttle means and a coacting parallel member mounted on and extending longitudinally of said shuttle means for movement therewith and adapted to slidably engage and rest upon the stationary slide member when said shuttle means is elevated so as to prevent downward movement thereof during said end shaping.

22. An infeed assembly as defined in claim 21 wherein the stationary slide member is in constant engagement with the adjacent side of the elongate shuttle means to prevent lateral movement thereof.

23. An infeed assembly as defined in claim 21 wherein said stationary slide member includes reinforcement means for preventing lateral displacement of said elongate shuttle means.

24. In a woodworking apparatus that has at least one end shaper, table means for supporting sticks of random length during their travel through the apparatus and an infeed assembly for advancing said sticks through said apparatus;

holddown means overlying and coacting with the table means for preventing displacement of the sticks during the shaping of their ends comprising a pressure head assembly for holding discrete sticks of random thickness, width and length against displacement while permitting travel of said sticks therebeneath, the pressure head assembly having a housing elongated logitudinally of the direction of travel of said sticks, an elongate wear strip of suitable flexible material slidably mounted in the underside of the housing and depending therefrom for upright movement relative thereto, the wear strip being articulated at spaced intervals and having upwardly opening recesses intersecting its articulations and terminating above the lower surface thereof so as to have upwardly facing bottoms, and means confined within each recess and bearing against its bottom for resiliently urging the underlying portion of said wear strip into engagement with said sticks, the articulations of said wear strip being formed by upwardly opening slots extending transversely entirely through said strip so as to intersect the recesses, the lower portions of the upwardly facing slots being enlarged so as to provide the desired flexibility of said wear strip.

* * * * *